(12) United States Patent
Stierle et al.

(10) Patent No.: US 7,230,683 B2
(45) Date of Patent: Jun. 12, 2007

(54) RANGE FINDING DEVICE COMPRISING AN AIMING DEVICE

(75) Inventors: Joerg Stierle, Waldenbuch (DE); Peter Wolf, Leinfelden-Echterdingen (DE); Kai Renz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 321 days.

(21) Appl. No.: 10/492,997

(22) PCT Filed: Jan. 31, 2003

(86) PCT No.: PCT/DE03/00276

§ 371 (c)(1),
(2), (4) Date: Apr. 19, 2004

(87) PCT Pub. No.: WO03/081174

PCT Pub. Date: Oct. 2, 2003

(65) Prior Publication Data

US 2005/0012922 A1 Jan. 20, 2005

(30) Foreign Application Priority Data

Mar. 26, 2002 (DE) ................................ 102 13 433

(51) Int. Cl.
*G01C 3/08* (2006.01)

(52) U.S. Cl. ..................... 356/4.01; 356/4.02; 356/4.1; 356/5.01

(58) Field of Classification Search ................ 356/4.01
See application file for complete search history.

(56) References Cited

U.S. PATENT DOCUMENTS

| 4,730,190 | A | * | 3/1988 | Win et al. .................... 342/118 |
| 5,046,839 | A | * | 9/1991 | Krangle ..................... 356/5.05 |
| 5,859,693 | A | * | 1/1999 | Dunne et al. .............. 356/4.01 |
| 6,035,539 | A | * | 3/2000 | Hollenbach et al. .......... 42/132 |
| 6,137,564 | A | | 10/2000 | Schmidt et al. |
| 2003/0098973 | A1 | | 5/2003 | Schmidt et al. |

FOREIGN PATENT DOCUMENTS

| DE | 198 53 513 | 5/1999 |
| DE | 100 16 309 | 10/2001 |
| GB | 2 331 581 | 5/1999 |

* cited by examiner

*Primary Examiner*—Thomas H. Tarcza
*Assistant Examiner*—Luke D. Ratcliffe
(74) *Attorney, Agent, or Firm*—Michael J. Striker

(57) ABSTRACT

The invention is based on a distance measuring device, in particular a handheld laser distance measuring device, with a control unit (12) disposed in a housing (10) and with a first aiming unit (14).

It is proposed that the first aiming unit (14) be embodied at least partly integrally with a protection unit (16) that protects the control unit (12).

15 Claims, 2 Drawing Sheets

RANGE FINDING DEVICE COMPRISING AN AIMING DEVICE

CROSS-REFERENCE

The invention described and claimed hereinbelow is also described in PCT/DE 03/00276, filed Jan. 31, 2003 and DE 102 13 433.2, filed Mar. 26, 2002. This German Patent Application, whose subject matter is incorporated here by reference, provides the basis for a claim of priority of invention under 35 U.S.C. 119 (a)–(d).

BACKGROUND OF THE INVENTION

The invention is based on a distance measuring device having an aiming device.

Handheld laser distance measuring devices are known which on a top side of their housing have a control unit with control keys and a display and moreover have an aiming unit. The aiming unit is formed by notches, made in the front and rear region on the top side of the housing, which form a sighting notch.

SUMMARY OF THE INVENTION

The invention is based on a distance measuring device, in particular a handheld laser distance measuring device, having a control unit disposed in a housing and having a first aiming unit.

It is proposed that the first aiming unit be embodied at least partly integrally with a protection unit that protects the control unit. With only a few additional components, advantageous protection of the control unit, specifically control keys and a display, can be achieved, along with an advantageous aiming unit.

Advantageously, the protection unit has at least one rib, which forms at least a part of the aiming unit and which, on a top side associated with the control unit, protrudes at least partway past a control element of the control unit. The control unit can be protected by the rib, and hindrance of the aiming unit by the control unit can be avoided.

In a further feature of the invention, it is proposed that the rib is disposed between at least two control elements of the control unit, as a result of which this rib, besides its protective function and its function in terms of the first aiming unit, can additionally be used as a guide element or feeler element for the user, specifically in such a way that a user can distinguish certain keys from one another without visual contact. Especially advantageously, a key that trips a measurement event can be separated from the remaining keys.

If the rib is oriented essentially transversely to the measurement direction, then advantageously a kind of roll bar for the control unit and advantageous protection of the control unit can be achieved with only a few components.

The rib can be formed by an additional component secured to the housing, or advantageously, it can be formed by a component integrally formed onto the housing, making it possible to dispense with additional components and reduce assembly effort and expense.

The first aiming unit can be integrated into the rib only, but advantageously the first aiming unit has a raised area, extending over the top side and cooperating with the rib; as a result, in particular, an advantageous sighting notch can be achieved, by making an indentation in the rib and in particular in the raised area, or by providing a raised area.

The raised area is advantageously formed by a protective cap disposed on one face end, as a result of which, with this protective cap, in particular an effective protection of the display of the control unit can be achieved.

It is furthermore proposed that besides the first aiming unit, at least one second aiming unit is provided, as a result of which the flexibility of use can be enhanced.

BRIEF DESCRIPTION OF THE DRAWINGS

Further advantages will become apparent from the ensuing description of the drawings. In the drawings, one exemplary embodiment of the invention is shown. The drawings, description and claims include numerous characteristics in combination. One skilled in the art will expediently consider the characteristics individually as well and put them together to make useful further combinations.

Shown are.

DETAILED DESCRIPTION OF THE PREFERRED EMBODIMENTS

Figure 1:
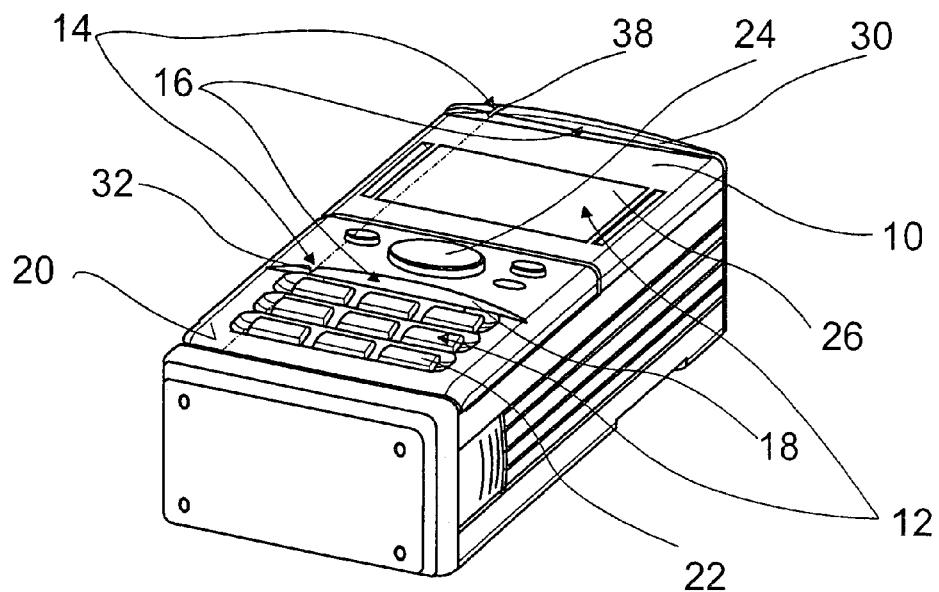
FIG. 1, a handheld laser distance measuring device, seen in a first perspective obliquely from above.
Figure 2:
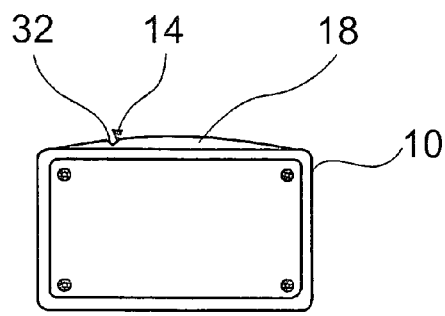
FIG. 2, the laser distance measuring device of FIG. 1 from behind.

FIG. 1 shows a handheld laser distance measuring device with a control unit 12 disposed in a housing 10. The control unit 12 has a display 26 and an input unit with control keys 22, 24; the control keys 22 are intended for selecting a certain measurement program, while the control key 24 is intended for tripping a measurement operation. The control keys 22 are countersunk in indentations 46 in the housing 10 and differ in shape and size, in a way that can be clearly felt, from the control key 24.

The laser distance measuring device also has a first aiming unit 14, which according to the invention is embodied integrally with a protection unit 16 that protects the control unit 12.

The protection unit 16 has a curved rib 18, extending transversely to the measurement direction 28, which on a top side 20 associated with the control unit 12 protrudes past the control keys 22, 24 and the display 26 of the control unit 12. The rib 18 integrally formed onto the housing 10 is disposed between the control keys 22 and the control key 24, so that without visual contact, a user can safely use the control key 24 without altering a measurement program, once selected by mistake with the control keys 22.

The first aiming unit 14 moreover has a curved raised area 30, extending over the top side 20 and cooperating with the rib 18; it is formed by a rubber protective cap secured to a front face end.

Figure 3:
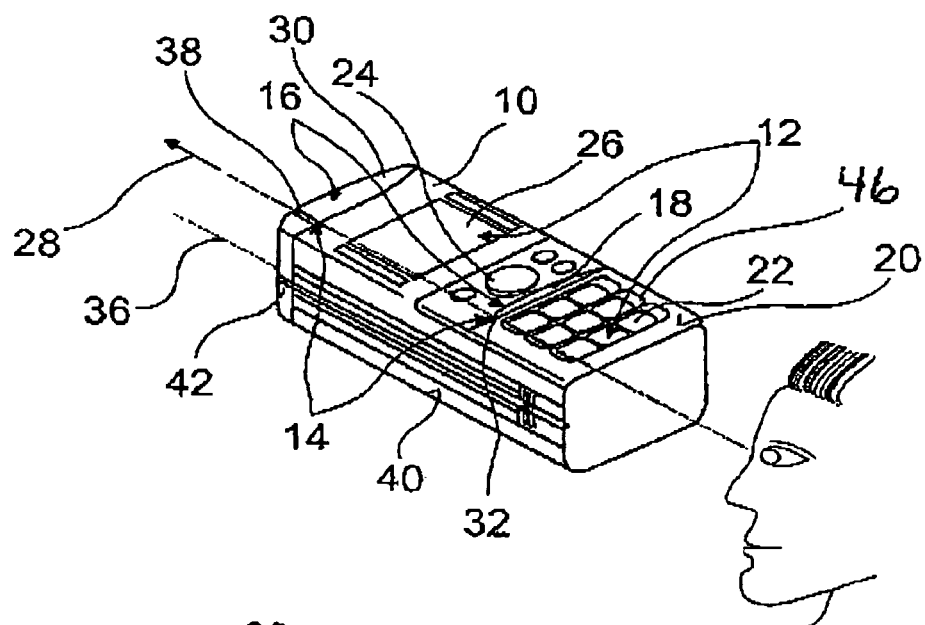
FIG. 3, the laser distance measuring device of FIG. 1 in a second perspective obliquely from above, in the process of homing using a first aiming unit.
Figure 4:
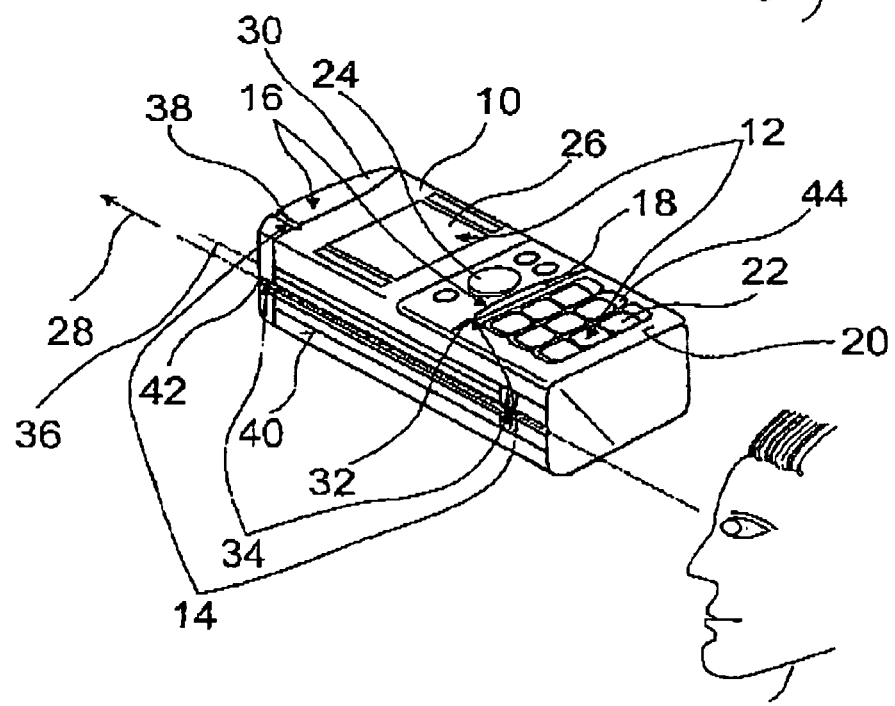
FIG. 4, the laser distance measuring device as shown in FIG. 3, in homing with a second aiming unit.

Above a laser axis 36, indentations 32, 38 are made in the rib 18 and in the raised area 30 and form a sighting notch. FIG. 3 shows the laser distance measuring device in aiming or homing using the first aiming unit 14, while FIG. 4 shows the laser distance measuring device in aiming or homing using a second aiming unit 34.

The second aiming unit 34 is formed by an indentation 42, made on a side face 40 of the housing 10 next to the laser axis 36 and extending over the length of the side face.

LIST OF REFERENCE NUMERALS

10 Housing
12 Control unit
14 Aiming unit
16 Protection unit
18 Rib
20 Top side
22 Control element
24 Control element
26 Control element
28 Measurement direction
30 Raised area
32 Indentation
34 Aiming unit
36 Laser axis
38 Indentation
40 Side face
42 Indentation
44 Indentation
46 Indentation

The invention claimed is:

1. A distance measuring device, comprising:
a control unit (12) disposed in a housing (10), the control unit comprising an input unit with at least a measurement key for tripping a measurement operation;
a first aiming unit (14);
a protection unit that protects the control unit; and
a top side on which the protection unit and the input unit are disposed,
wherein the first aiming unit (14) is embodied at least partly integrally with the protection unit (16),
wherein the protection unit (16) has at least one rib (18), wherein said at least one rib forms at least a part of the aiming unit (14) and, on said top side associated with the control unit (12), protrudes at least partway past a control element (22, 24, 26) of the control unit (12), and wherein the at least one rib is disposed between two control keys of the input unit.

2. The distance measuring device of claim 1, wherein the at least one rib (18) is disposed between at least two control elements (22, 24) of the control unit (12).

3. The distance measuring device of claim 1, wherein the at least one rib (18) is oriented essentially transversely to the measurement direction (28).

4. The distance measuring device of claim 1, wherein the at least one rib (18) is formed integrally onto the housing (10).

5. The distance measuring device of claim 1, wherein the first aiming unit (14) has a raised area (30), extending over the top side (20) and cooperating with the at least one rib (18).

6. The distance measuring device of claim 5, wherein the raised area (30) is formed by a protective cap disposed on one face end.

7. The distance measuring device of claim 1, wherein the at least one rib (18) has an indentation (32) that forms a sighting notch.

8. The distance measuring device of claim 1, wherein besides the first aiming unit (14), at least one second aiming unit (34) is provided.

9. The distance measuring device of claim 2, wherein the rib is disposed between at least two control elements of the input unit.

10. The distance measuring device of claim 1, wherein the input unit comprises control keys which are separated from the measurement key by means of the at least one rib.

11. The distance measuring device of claim 1, wherein the housing has indentations, wherein control keys of the input unit are countersunk in the indentations.

12. The distance measuring device of claim 1, wherein the input unit comprises control keys and the rib protrudes past the control keys.

13. The distance measuring device of claim 1, wherein the control unit has a display, the input unit has control keys, and the protection unit is disposed on the top side between the display and the control keys.

14. A distance measuring device of claim 1, consisting of a handheld laser distance measuring device.

15. A distance measuring device, comprising:
a control unit (12) disposed in a housing (10), the control unit comprising an input unit with at least a measurement key for tripping a measurement operation;
a first aiming unit (14);
a protection unit that protects the control unit; and
a top side on which the protection unit and the input unit are disposed,
wherein the first aiming unit (14) is embodied at least partly integrally with the protection unit (16),
wherein the protection unit (16) has at least one rib (18), wherein said at least one rib forms at least a part of the aiming unit (14) and, on said top side associated with the control unit (12), protrudes at least partway past a control element (22, 24, 26) of the control unit (12), and wherein the at least one rib (18) is formed integrally onto the housing (10).

* * * * *